(12) United States Patent
Choe et al.

(10) Patent No.: US 12,559,246 B1
(45) Date of Patent: Feb. 24, 2026

(54) REDUCING EDDY CURRENT PROPAGATION IN ELECTRIC DEVICE HOUSING

(71) Applicant: RTX Corporation, Farmington, CT (US)

(72) Inventors: Jung Muk Choe, Glastonbury, CT (US); Thomas E. Clark, Wells, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/983,819

(22) Filed: Dec. 17, 2024

(51) Int. Cl.
B64D 31/16 (2024.01)

(52) U.S. Cl.
CPC .................................... B64D 31/16 (2024.01)

(58) Field of Classification Search
CPC ................................ B64D 31/16; B64D 31/00
See application file for complete search history.

(56) References Cited

U.S. PATENT DOCUMENTS

| | | | | |
|---|---|---|---|---|
| 6,232,553 | B1 * | 5/2001 | Regen .................... | H02G 3/083 174/64 |
| 9,093,765 | B2 | 7/2015 | Kuji | |
| 9,252,512 | B2 | 2/2016 | Debabrata | |
| 12,316,087 | B2 * | 5/2025 | Burks .................... | H01R 9/223 |
| 2016/0290347 | A1 * | 10/2016 | Kinoshita ............ | H01R 13/187 |
| 2019/0039716 | A1 * | 2/2019 | Jacquemoud-Collet ..................... B64D 27/35 |
| 2023/0123533 | A1 * | 4/2023 | Chivite Zabalza ....... | H02J 3/02 60/793 |
| 2024/0364091 | A1 * | 10/2024 | Bodington ........... | H02G 15/115 |

* cited by examiner

*Primary Examiner* — Rodney A Bonnette
(74) *Attorney, Agent, or Firm* — Getz Balich LLC

(57) ABSTRACT

An aircraft assembly includes a first electric cable and an electric device. The electric device includes a device housing and a first electric terminal disposed within an internal volume of the device housing. The device housing includes a first metal sidewall, a first wall cable port and an open first wall aperture next to the first wall cable port. The first metal sidewall is between and borders the internal volume and an external environment. The first wall cable port projects through the first metal sidewall from the external environment to the internal volume. The open first wall aperture projects through the first metal sidewall from the external environment to the internal volume. The first electric cable projects longitudinally through the first wall cable port into the internal volume. The first electric cable is received by and is electrically coupled to the first electric terminal within the internal volume.

19 Claims, 6 Drawing Sheets

REDUCING EDDY CURRENT PROPAGATION IN ELECTRIC DEVICE HOUSING

BACKGROUND OF THE DISCLOSURE

1. Technical Field

This disclosure relates generally to an electric device for an aircraft and, more particularly, to a housing for the electric device.

2. Background Information

An aircraft may include various electric devices such as, but not limited to, junction boxes, electric machines, controllers, and the like. Various housing are known in the art for such electric devices. While these known electric device housings have various benefits, there is still room in the art for improvement.

SUMMARY OF THE DISCLOSURE

According to an aspect of the present disclosure, an assembly is provided for an aircraft. This assembly includes a first electric cable and an electric device for the aircraft. The electric device includes a device housing and a first electric terminal disposed within an internal volume of the device housing. The device housing includes a first metal sidewall, a first wall cable port and an open first wall aperture next to the first wall cable port. The first metal sidewall is between and borders the internal volume and an external environment outside of the electric device. The first wall cable port projects through the first metal sidewall from the external environment to the internal volume. The open first wall aperture projects through the first metal sidewall from the external environment to the internal volume. The first electric cable projects longitudinally through the first wall cable port into the internal volume. The first electric cable is received by and is electrically coupled to the first electric terminal within the internal volume.

According to another aspect of the present disclosure, another assembly is provided for an aircraft. This assembly includes a first electric cable and an electric device for the aircraft. The electric device includes a device housing and a first electric terminal disposed within an internal volume of the device housing. The device housing is configured to substantially fluidly isolate the internal volume from an external environment outside of the electric device. The device housing includes a first metal sidewall, a first wall cable port and a first wall aperture arranged proximate to the first wall cable port. The first metal sidewall is between and borders the internal volume and the external environment. The first wall cable port extends through the first metal sidewall between the external environment and the internal volume. The first wall aperture extends through the first metal sidewall between the external environment and the internal volume. The first electric cable extends longitudinally through the first wall cable port into the internal volume. The first electric cable is received by and electrically coupled to the first electric terminal within the internal volume. The first wall aperture is configured to obstruct a magnetic field conduction path through the first metal sidewall.

According to still another aspect of the present disclosure, another assembly is provided for an aircraft. This assembly includes a plurality of first electric cables and an electric device for the aircraft. The electric device includes a device housing and a plurality of first electric terminals disposed within an internal volume of the device housing. The device housing includes a first metal sidewall, a plurality of first wall cable ports and a plurality of first wall apertures. The first metal sidewall is between and borders the internal volume and an external environment surrounding the electric device. Each of the first wall cable ports extends through the first metal sidewall. The first wall apertures are arranged in an array that is next to and overlaps each of the first wall cable ports. Each of the first wall apertures extends through the first metal sidewall. Each of the first electric cables extends longitudinally from the external environment, through a respective one of the first wall apertures, into the internal volume. Each of the first electric cables is received by and is electrically coupled to a respective one of the first electric terminals within the internal volume. The first wall apertures are configured to obstruct magnetic field conduction paths in the first metal sidewall.

The device housing may also include a non-magnetic cover connected to the first metal sidewall and covering the first wall aperture.

The device housing may also include a non-magnetic material plugging the first wall aperture.

The open first wall aperture may be configured to obstruct an eddy current conduction path through the first metal sidewall.

The first wall cable port may have a circular cross-sectional geometry. The open first wall aperture may have a non-circular cross-sectional geometry.

The first wall cable port may have a circular cross-sectional geometry. The open first wall aperture may have an elongated cross-sectional geometry.

The first wall cable port may have a first port cross-sectional area. The open first wall aperture may have a first aperture cross-sectional area that is smaller than the first port cross-sectional area.

The open first wall aperture may be spaced from the first wall cable port by an inter aperture-port distance. The inter aperture-port distance may be equal to or smaller than a diameter of the first wall cable port.

The open first wall aperture may have a major axis dimension and a minor axis dimension. The major axis dimension and the minor axis dimension may each be smaller than a diameter of the first wall cable port.

The open first wall aperture may have a major axis dimension and a minor axis dimension. The major axis dimension may be equal to or larger than a diameter of the first wall cable port. The minor axis dimension may be smaller than the diameter of the first wall cable port.

The open first wall aperture may be one of a plurality of open first wall apertures arranged in an array that is next to the first wall cable port. Each of the open first wall apertures may project through the first metal sidewall from the external environment to the internal volume.

The open first wall aperture may be one of a plurality of open first wall apertures arranged to a first side of the first cable port. Each of the open first wall apertures may project through the first metal sidewall from the external environment to the internal volume.

The open first wall aperture may be one of a plurality of open first wall apertures. Each of the open first wall apertures may project through the first metal sidewall from the external environment to the internal volume. A first of the open first wall apertures may be disposed to a first side of the first wall cable port. A second of the open first wall apertures may be disposed to a second side of the first wall cable port.

The device housing may also include a cover connected to the first metal sidewall and covering the open first wall aperture.

The cover may be contained within the device housing.

The cover may be configured from or otherwise include a non-magnetic material.

The cover may be configured from or otherwise include at least one of a ceramic material, a polymer matrix composite material, a ceramic matrix composite material or an organic matrix composite material.

The internal volume may be substantially fluidly decoupled from the external environment by the device housing.

The assembly may also include a second electric cable and a terminal block. The second electric cable may project longitudinally into the internal volume through a second wall cable port in a second metal sidewall of the device housing. The second electric cable may be received by and electrically coupled to a second electric terminal within the internal volume. The terminal block may include and may electrically couple the first electric terminal and the second electric terminal.

The electric device may be configured as a junction box for the aircraft.

The electric device may be configured as an electric machine for the aircraft. The electric machine may be configurable as an electric motor and/or an electric generator.

The electric device may be configured as a controller.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
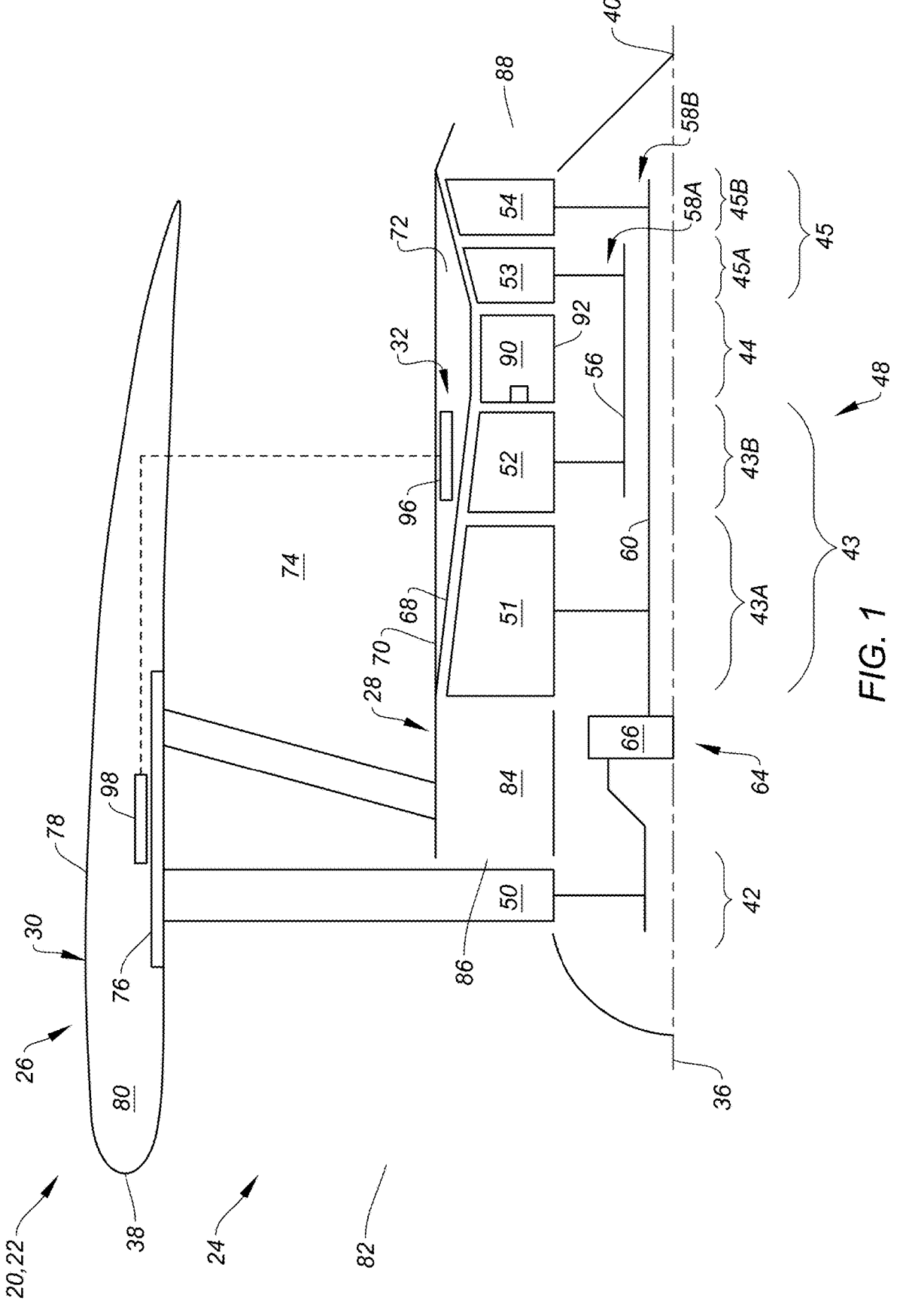
FIG. 1 is a partial schematic illustration of an aircraft propulsion system.

FIG. 1 illustrates a powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a prop-fan propulsion system, a pusher fan propulsion system, or any other type of ducted or open rotor propulsion system. Moreover, the aircraft powerplant 20 is not limited to propulsion system applications. The aircraft powerplant 20, for example, may alternatively (or also) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28 and an outer housing structure 30. The aircraft propulsion system 22 also includes an electric machine system 32; see also FIG. 2. The aircraft propulsion system 22 extends axially along an axis 36 between an axial forward, upstream end 38 of the aircraft propulsion system 22 and an axial aft, downstream end 40 of the aircraft propulsion system 22. Briefly, the propulsion system axis 36 may be a centerline axis of the aircraft propulsion system 22, the turbine engine 24 and/or one or more of its members. The propulsion system axis 36 may also or alternatively be a rotational axis for one or more members of the turbine engine 24.

The aircraft propulsion system 22 and its turbine engine 24 of FIG. 1 include a propulsor section 42 (e.g., a fan section), a compressor section 43, a combustor section 44 and a turbine section 45. The compressor section 43 of FIG. 1 includes a low pressure compressor (LPC) section 43A and a high pressure compressor (HPC) section 43B. The turbine section 45 of FIG. 1 includes a high pressure turbine (HPT) section 45A and a low pressure turbine (LPT) section 45B. Here, at least (or only) the LPC section 43A, the HPC section 43B, the combustor section 44, the HPT section 45A and the LPT section 45B collectively form a core 48 of the turbine engine 24.

The engine sections 42-45B may be arranged sequentially along the propulsion system axis 36 within the propulsion system housing 26. The propulsor section 42 includes a bladed propulsor rotor 50; e.g., a fan rotor. The LPC section 43A includes a bladed low pressure compressor (LPC) rotor 51. The HPC section 43B includes a bladed high pressure compressor (HPC) rotor 52. The HPT section 45A includes a bladed high pressure turbine (HPT) rotor 53. The LPT section 45B includes a bladed low pressure turbine (LPT) rotor 54.

The HPC rotor 52 is coupled to and rotatable with the HPT rotor 53. The HPC rotor 52 of FIG. 1, for example, is connected to the HPT rotor 53 through a high speed shaft 56. At least (or only) the HPC rotor 52, the HPT rotor 53 and the high speed shaft 56 collectively form a high speed rotating structure 58A; e.g., a high speed spool of the engine core 48. This high speed rotating structure 58A of FIG. 1 and its members 52, 53 and 56 are rotatable about the propulsion system axis 36. However, it is contemplated the high speed rotating structure 58A may alternatively be rotatable about another axis radially and/or angularly offset from the rotational axis of the propulsor rotor 50 and/or the centerline axis of the turbine engine 24.

The LPC rotor 51 is coupled to and rotatable with the LPT rotor 54. The LPC rotor 51 of FIG. 1, for example, is connected to the LPT rotor 54 through a low speed shaft 60. At least (or only) the LPC rotor 51, the LPT rotor 54 and the low speed shaft 60 collectively form a low speed rotating structure 58B; e.g., a low speed spool of the engine core 48. This low speed rotating structure 58B is further coupled to the propulsor rotor 50 through a drivetrain 64. The drivetrain 64 may be configured as a geared drivetrain, where a geartrain 66 (e.g., a transmission, a speed change device, an epicyclic geartrain, etc.) is disposed between and operatively couples the propulsor rotor 50 to the low speed rotating structure 58B and its LPT rotor 54. With this arrangement, the propulsor rotor 50 may rotate at a different (e.g., slower) rotational speed than the low speed rotating structure 58B and its LPT rotor 54. Alternatively, the drivetrain 64 may be configured as a direct drive drivetrain, where the geartrain 66 is omitted. With such an arrangement, the propulsor rotor 50 rotates at a common (the same) rotational speed as the low speed rotating structure 58B and its LPT rotor 54. The low speed rotating structure 58B of FIG. 1 and its members 51, 54 and 60 as well as the propulsor rotor 50 are rotatable about the propulsion system axis 36. However, it is contemplated the low speed rotating structure 58B may alternatively be rotatable about another axis radially and/or angularly offset from the rotational axis of the propulsor rotor 50 and/or the centerline axis of the turbine engine 24.

The inner housing structure 28 of FIG. 1 includes an inner case 68 (e.g., a core case) for the turbine engine 24, an inner nacelle structure 70 (sometimes referred to as an inner fixed structure (IFS)) and an internal inner housing compartment 72. The inner case 68 is disposed radially outboard of, extends axially along and may circumscribe one or more or all of the engine sections 43A-45B and their respective engine rotors 51-54. The inner case 68 may thereby house and provide a support structure for the respective engine sections 43A-45B and their respective engine rotors 51-54. The inner nacelle structure 70 is configured to provide an aerodynamic cover over the engine core 48 and its inner case 68. The inner housing compartment 72 of FIG. 1 is formed by and is disposed radially between the inner case 68 and an inner barrel of the inner nacelle structure 70. The inner housing structure 28 and its inner nacelle structure 70 may also form a radial inner peripheral boundary of a (e.g., annular) bypass flowpath 74 within the aircraft propulsion system 22.

The outer housing structure 30 of FIG. 1 includes an outer case 76 (e.g., a fan case) for the turbine engine 24, an outer nacelle structure 78 and an internal outer housing compartment 80. The outer case 76 is disposed radially outboard of, extends axially along and may circumscribe the propulsor section 42 and its propulsor rotor 50. The outer case 76 may thereby house and provide a containment structure for the propulsor section 42 and its propulsor rotor 50. The outer nacelle structure 78 is configured to provide an aerodynamic cover over the outer case 76. The outer housing compartment 80 of FIG. 1 is at least partially formed by and disposed radially between the outer case 76 and an outer portion (e.g., fan cowls) of the outer nacelle structure 78. The outer housing structure 30 and its outer nacelle structure 78 may also form a radial outer peripheral boundary of the bypass flowpath 74.

During operation, ambient air from outside of the aircraft enters the aircraft propulsion system 22 and its turbine engine 24 through an airflow inlet 82. This air is directed across the propulsor section 42 and into a (e.g., annular) core flowpath 84 and the bypass flowpath 74. The core flowpath 84 of FIG. 1 extends sequentially through the LPC section 43A, the HPC section 43B, the combustor section 44, the HPT section 45A and the LPT section 45B from an airflow inlet 86 into the core flowpath 84 to a combustion products exhaust 88 out from the core flowpath 84 and the engine core 48. The air entering the core flowpath 84 may be referred to as "core air". The bypass flowpath 74 extends through a bypass duct, which bypass flowpath 74 and bypass duct bypass (e.g., are disposed radially outboard of and extend along) the engine core 48 and the inner housing structure 28. The air within the bypass flowpath 74 may be referred to as "bypass air".

The core air is compressed by the LPC rotor 51 and the HPC rotor 52 and is directed into a (e.g., annular) combustion chamber 90 of a (e.g., annular) combustor 92 in the combustor section 44. Fuel is injected into the combustion chamber 90 by one or more fuel injectors and mixed with the compressed core air to provide a fuel-air mixture. This fuel-air mixture is ignited and combustion products thereof flow through and sequentially drive rotation of the HPT rotor 53 and the LPT rotor 54 about the propulsion system axis 36. The rotation of the HPT rotor 53 and the LPT rotor 54 respectively drive rotation of the HPC rotor 52 and the LPC rotor 51 about the propulsion system axis 36 and, thus, compression of the air received from the core inlet 86. The rotation of the LPT rotor 54 also drives rotation of the propulsor rotor 50. The rotation of the propulsor rotor 50 propels the bypass air through and out of the bypass flowpath 74. The propulsion of the bypass air may account for a majority of thrust generated by the turbine engine 24 of FIG. 1.

Figure 2:
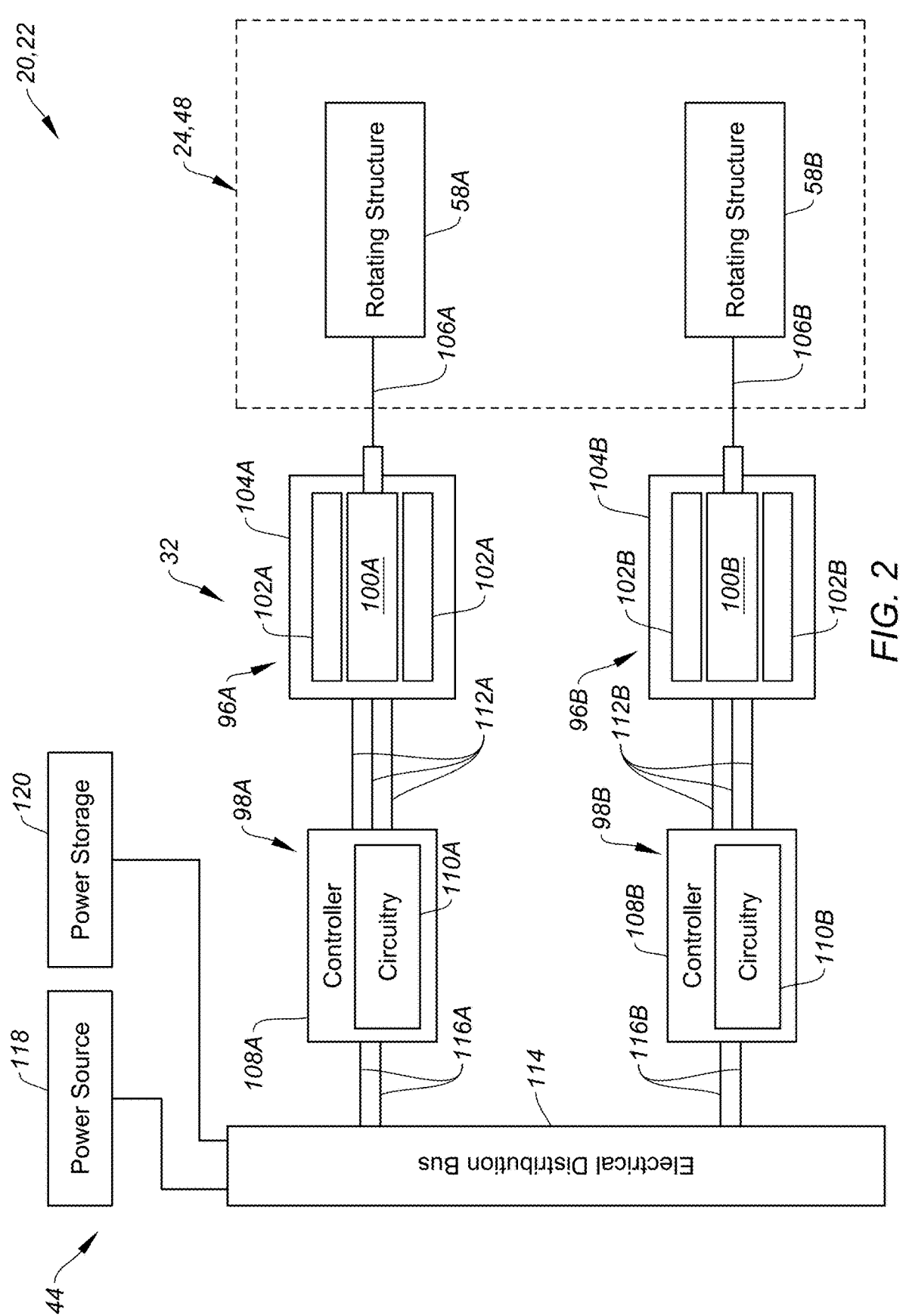
FIG. 2 is a schematic illustration of a portion of the aircraft propulsion system at an electric machine system.

Referring to FIG. 2, the electric machine system 32 is electrically coupled to an electrical system 94 for the aircraft. The electric machine system 32 of FIG. 2 includes one or more electric machines 96A and 96B (generally referred to as "96") and one or more electric machine (EM) controllers 98A and 98B (generally referred to as "98"). For ease of description, each electric machine 96 of FIG. 2 is described below as being electrically coupled to, controlled by and/or otherwise associated with a single, dedicated one of the EM controllers 98. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 96A, 96B of FIG. 2 includes an electric machine rotor 100A, 100B (generally referred to as "100"), an electric machine stator 102A, 102B (generally referred to as "102") and an electric machine housing 104A, 104B (generally referred to as "104"). The machine rotor 100 is rotatable about a rotational axis of the machine rotor 100, which rotational axis may also be an axial centerline of the electric machine 96. The machine stator 102 of FIG. 2 is radially outboard of and circumscribes the machine rotor 100. With this arrangement, each electric machine 96 is configured as a radial flux electric machine. The electric machines 96 of the present disclosure, however, are not limited to such an exemplary rotor-stator configuration nor to radial flux arrangements. The machine rotor 100, for example, may alternatively be radially outboard of and circumscribe the machine stator 102. In another example, the machine rotor 100 may be axially next to the machine stator 102 configuring the respective electric machine 96 as an axial flux electric machine. Referring again to FIG. 2, the machine rotor 100 and the machine stator 102 are at least partially or completely housed within the machine housing 104.

Each electric machine 96A, 96B may be operatively coupled to a respective one of the engine rotating structures 58A, 58B (generally referred to as "58"). Each machine rotor 100 of FIG. 2, for example, is mechanically coupled to and rotatable with the respective engine rotating structure 58 through a drivetrain 106A, 106B (generally referred to as "106"). This drivetrain 106 may be configured as or otherwise include a shaft, a tower shaft assembly, a gearbox, and/or the like. For ease of description, each machine rotor 100 of FIG. 2 is described below as being coupled to and rotatable with a unique one of the engine rotating structures 58 of the turbine engine 24. However, it is contemplated multiple machine rotors may alternatively be coupled to and rotatable with a common engine rotating structure 58. It is also contemplated a single one of the machine rotors may be coupled to and rotatable with multiple engine rotating structures, directly or through another device such as a differential or a clutch system. In addition, while the electric machines 96 are described above as being coupled to the engine rotating structures 58, it is contemplated the machine rotor 100 of one or more of the electric machines 96 may alternatively be operatively coupled to another rotating device through the drivetrain 106 such as, but not limited to, a pump rotor, an auxiliary compressor rotor, an actuator rotor, or the like.

Each electric machine 96 of FIG. 2 may be configurable as an electric motor and/or an electric generator; e.g., an electric motor-generator. For example, during a motor mode of operation, a respective electric machine 96 may operate as the electric motor to convert electricity received from the aircraft electrical system 94. The machine stator 102, for example, may generate an electromagnetic field with the machine rotor 100 using a current of electricity received from the aircraft electrical system 94 through the respective EM controller 98. This electromagnetic field may drive rotation of the machine rotor 100. The machine rotor 100, in turn, may provide mechanical power to and drive rotation of the respective engine rotating structure 58 through the respective drivetrain 106. This mechanical power may be provided to boost power or completely power the rotation of the respective engine rotating structure 58. By contrast, during a generator mode of operation, the electric machine 96 may operate as the electric generator to convert mechanical power received from the respective engine rotating structure 58 into electricity. Rotation of the machine rotor 100, for example, may be rotationally driven by rotation of the respective engine rotating structure 58 through the respective drivetrain 106. The rotation of the machine rotor 100 may generate an electromagnetic field with the machine stator 102, and the machine stator 102 may convert energy from the electromagnetic field into electricity. The respective electric machine 96 may then provide a current of electricity to the aircraft electrical system 94 through the respective EM controller 98 for storage and/or further use. The electric machines 96 of the present disclosure, however, are not limited to such exemplary operation. For example, one, some or all of the electric machines 96 may alternatively each be configured as a dedicated electric generator; e.g., without the electric motor functionality. One, some or all of the electric machines 96 may alternatively each be configured as a dedicated electric motor; e.g., without the electric generator functionality.

Each EM controller 98 includes a controller housing 108A, 108B (generally referred to as "108") and internal controller circuitry 110A, 110B (generally referred to as "110"). The controller housing 108 may be configured as an enclosed case (e.g., a closed or sealed container) for the respective controller circuitry 110. The controller circuitry 110 is disposed within an interior of the controller housing 108; e.g., an internal chamber or other volume(s) within and enclosed by the controller housing 108. The controller circuitry 110 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), a processing device, memory, a communication module, electrical transformer(s), electrical rectifier(s), and/or the like.

Each EM controller 98 is electrically coupled to a respective one of the electric machines 96 through one or more electric cables 112A, 112B (generally referred to as "112"); e.g., high voltage electric cables, power feeder cables, etc. More particularly, the controller circuitry 110 of each EM controller 98 is electrically coupled to the respective electric machine 96 and its machine stator 102 through the respective electric cables 112. Similarly, each EM controller 98 is electrically coupled to an electrical distribution bus 114 of the aircraft electrical system 94 through one or more electric cables 116A, 116B (generally referred to as "116"); e.g., high voltage electric cables, power feeder cables, etc. More particularly, the controller circuitry 110 of each EM controller 98 is electrically coupled to the aircraft electrical system 94 and its electrical distribution bus 114 through the respective electric cables 116.

Each EM controller 98 and its controller circuitry 110 are configured to control operation of a respective one of the electric machines 96. For example, when operating as the electric motor, the respective EM controller 98 and its controller circuitry 110 are configured to regulate a flow of electricity from the aircraft electrical system 94 to the respective electric machine 96. This electricity flow regulation may include: (a) turning-on the flow of electricity from the aircraft electrical system 94 to the respective electric machine 96 (e.g., electrically coupling the respective electric machine 96 to the aircraft electrical system 94); (b) turning-off the flow of electricity from the aircraft electrical system 94 to the respective electric machine 96 (e.g., electrically decoupling the respective electric machine 96 from the aircraft electrical system 94); (c) moderating the flow of electricity from the aircraft electrical system 94 to the respective electric machine 96. Here, the respective EM controller 98 operates as a motor controller. In another example, when operating as the electric generator, the respective EM controller 98 and its controller circuitry 110 are configured to regulate a flow of electricity from the respective electric machine 96 to the aircraft electrical system 94. This electricity flow regulation may include: (a) turning-on the flow of electricity from the respective electric machine 96 to the aircraft electrical system 94 (e.g., electrically coupling the respective electric machine 96 to the aircraft electrical system 94); (b) turning-off the flow of electricity from the respective electric machine 96 to the aircraft electrical system 94 (e.g., electrically decoupling the respective electric machine 96 from the aircraft electrical system 94); (c) moderating the flow of electricity from the respective electric machine 96 to the aircraft electrical system 94. Here, the respective EM controller 98 operates as a generator controller.

The aircraft electrical system 94 includes the electrical distribution bus 114. This aircraft electrical system 94 may also include a power source 118 and/or a power storage 120. The electrical distribution bus 114 is electrically coupled to each of the electric machines 96 through their respective EM controllers 98. The electrical distribution bus 114 is also electrically coupled to the power source 118 and the power storage 120. Of course, the electrical distribution bus 114 may also be electrically coupled to one or more additional electric components of the aircraft propulsion system 22 and/or one or more additional electric components of the aircraft outside of the aircraft propulsion system 22; e.g., airframe mounted electric components, etc. With this arrangement, the electrical distribution bus 114 provides an intermediate connection between the various electrical members (e.g., 98A, 98B, 118 and 120). The power source 118 may be an electric generator powered by the turbine engine 24 (see FIG. 1) or an electric generator powered by another aircraft powerplant; e.g., an engine of a companion aircraft propulsion system, an engine of an auxiliary power unit (APU), a fuel cell system, etc. The power storage 120 is configured to receive electricity from the electrical distribution bus 114 for storage. The power storage 120 is also configured to provide the stored electricity to the electrical distribution bus 114. The power storage 120, for example, may be configured as or otherwise include one or more electricity storage devices; e.g., batteries, super capacitors, etc. Of course, it is contemplated one of the electric machines 96 (e.g., operating as the electric generator) may also or alternatively operate as a power source for another one of the electric machines 96 (e.g., operating as the electric motor).

Figure 3:
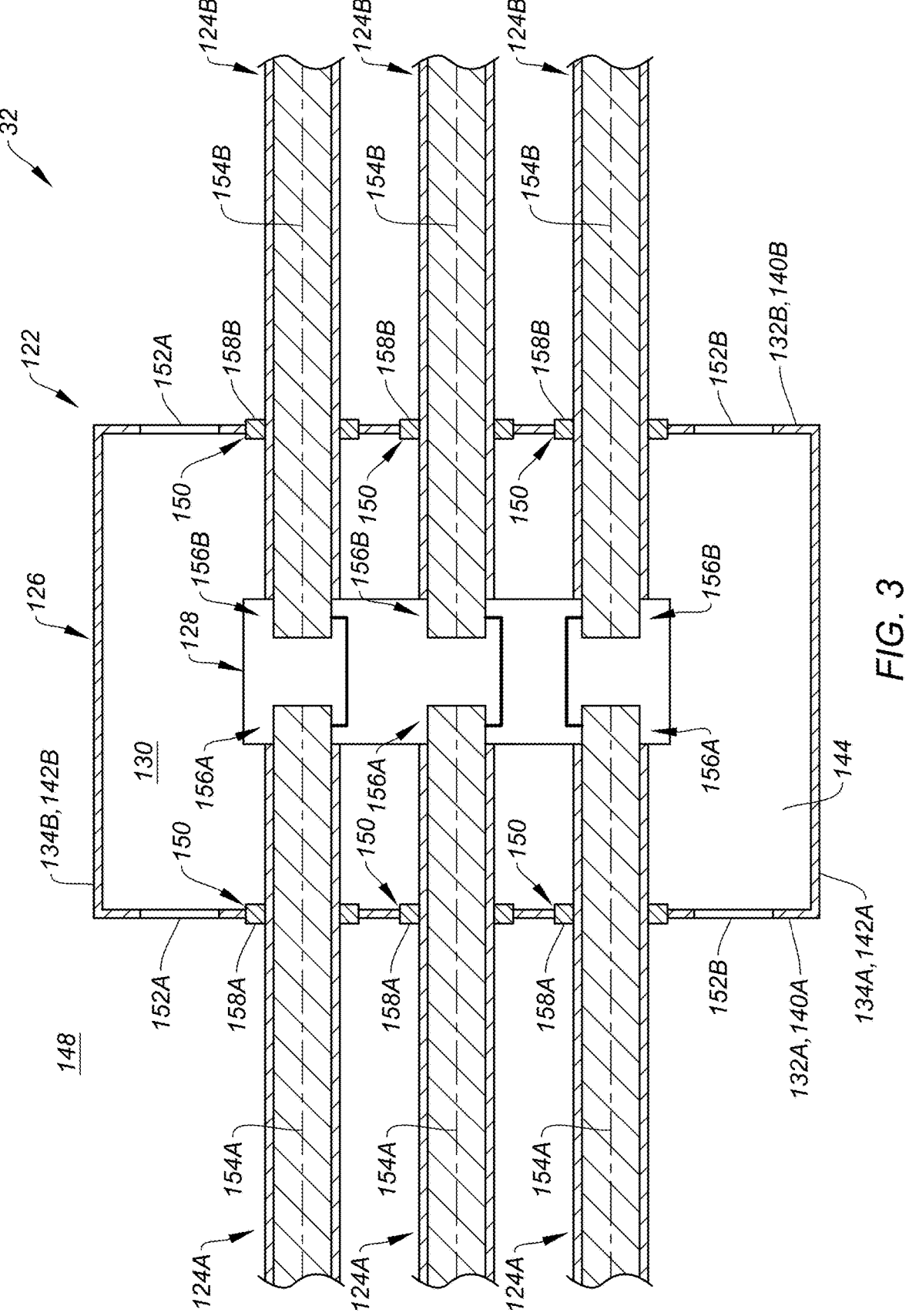
FIG. 3 is a partial sectional illustration of an electric device electrically coupling a first set of electric cables to a second set of electric cables.

FIG. 3 illustrates an electric device 122 receiving and electrically coupled to a set of one or more first electric cables 124A and a set of one or more second electric cables 124B. For ease of description, the electric device 122 is described below as an electrical junction box (e.g., a cable-to-cable coupler) for respectively electrically coupling the first electric cables 124A to the second electric cables 124B. Each first electric cable 124A may be a first segment of a respective one of the electric cables 112 of FIG. 2; e.g., a segment electrically coupled to the respective electric machine 96. Each second electric cable 124B may be a second segment of a respective one of the electric cables 112 of FIG. 2; e.g., a segment electrically coupled to the respective EM controller 98. The present disclosure, however, is not limited to such an exemplary arrangement as described below in further detail.

Figure 4:
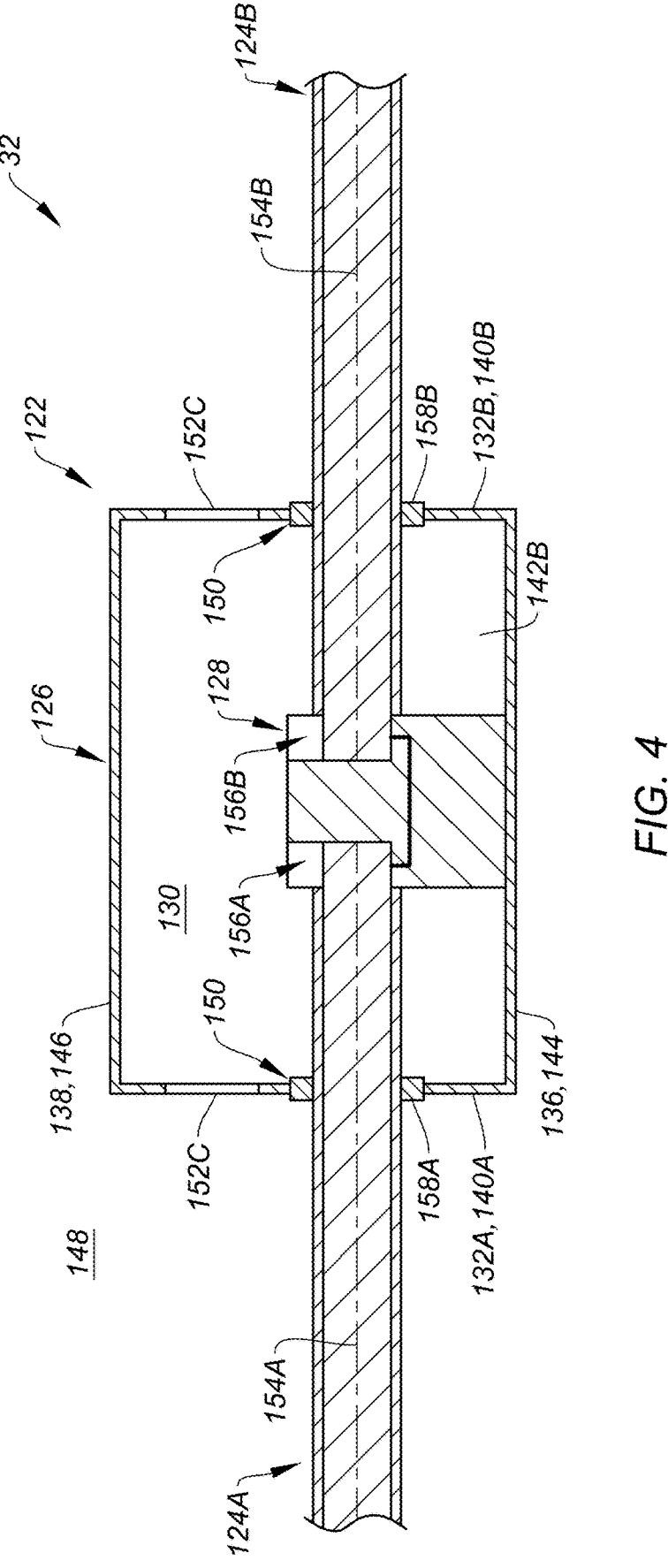
FIG. 4 is another partial sectional illustration of the electric device electrically coupling the first set of electric cables to the second set of electric cables.

The electric device 122 of FIG. 3 includes a device housing 126 (e.g., a junction box case, a terminal case, etc.) and a terminal block 128 disposed within an internal volume 130 (e.g., an internal compartment, an internal cavity, etc.) of the device housing 126. The electric device 122 and its device housing 126 extend longitudinally between opposing longitudinal sides 132A and 132B (generally referred to as "132") of the electric device 122. The electric device 122 and its device housing 126 extend laterally between opposing lateral sides 134A and 134B (generally referred to as "134") of the electric device 122. Referring to FIG. 4, the electric device 122 and its device housing 126 extend vertically (e.g., radially relative to the propulsion system axis 36 of FIG. 1) between a bottom 136 (e.g., an inner end) of the electric device 122 and a top 138 (e.g., an outer end) of the electric device 122.

The device housing 126 of FIG. 3 includes a plurality of sidewalls 140A, 140B, 142A and 142B, a bottom wall 144 and a top wall 146 (see FIG. 4). Each of the sidewalls 140A, 140B, 142A and 142B is disposed at (e.g., on, adjacent or proximate) a respective side 132A, 132B, 134A, 134B of the device housing 126. These housing sidewalls 140A, 140B, 142A and 142B collectively form an outer peripheral side boundary (e.g., side perimeter) of the internal volume 130. Each longitudinal sidewall 140A, 140B (generally referred to as "140") of FIG. 3, for example, forms a respective device longitudinal side 132A, 132B. Each longitudinal sidewall 140 extends laterally between and is connected to (e.g., formed integral with or otherwise attached to) the lateral sidewalls 142A and 142B. Each lateral sidewall 142A, 142B (generally referred to as "142") of FIG. 3 forms a respective device lateral side 134A, 134B. Each lateral sidewall 142 extends longitudinally between the longitudinal sidewalls 140A and 140B. Each of the housing sidewalls 140A, 140B, 142A and 142B extends vertically between and is connected to (e.g., formed integral with or otherwise attached to) the bottom wall 144 at the device bottom 136 and the top wall 146 at the device top 138 (see FIG. 4). With this arrangement, each of the housing sidewalls 140A, 140B, 142A and 142B is disposed between and borders the internal volume 130 and an external environment 148 outside of (e.g., surrounding) the electric device 122 and its device housing 126. The device housing 126 may thereby (e.g., completely) surround the internal volume 130. Briefly, the external environment 148 may be an environment within one of the compartments 72, 80 of FIG. 1, within a bifurcation structure, within a pylon structure, or the like.

The device housing 126 and its members 140, 142, 144 and 146 (see FIG. 4) are constructed from, or otherwise include, metal; e.g., sheet metal. The device housing 126, for example, may be configured as a metal case; e.g., a metal box. The metal may be a magnetic metal such as, but not limited to, steel, alloy steel, nickel alloy steel, aluminum or copper. The present disclosure, however, is not limited to the foregoing exemplary metals.

Figure 5:
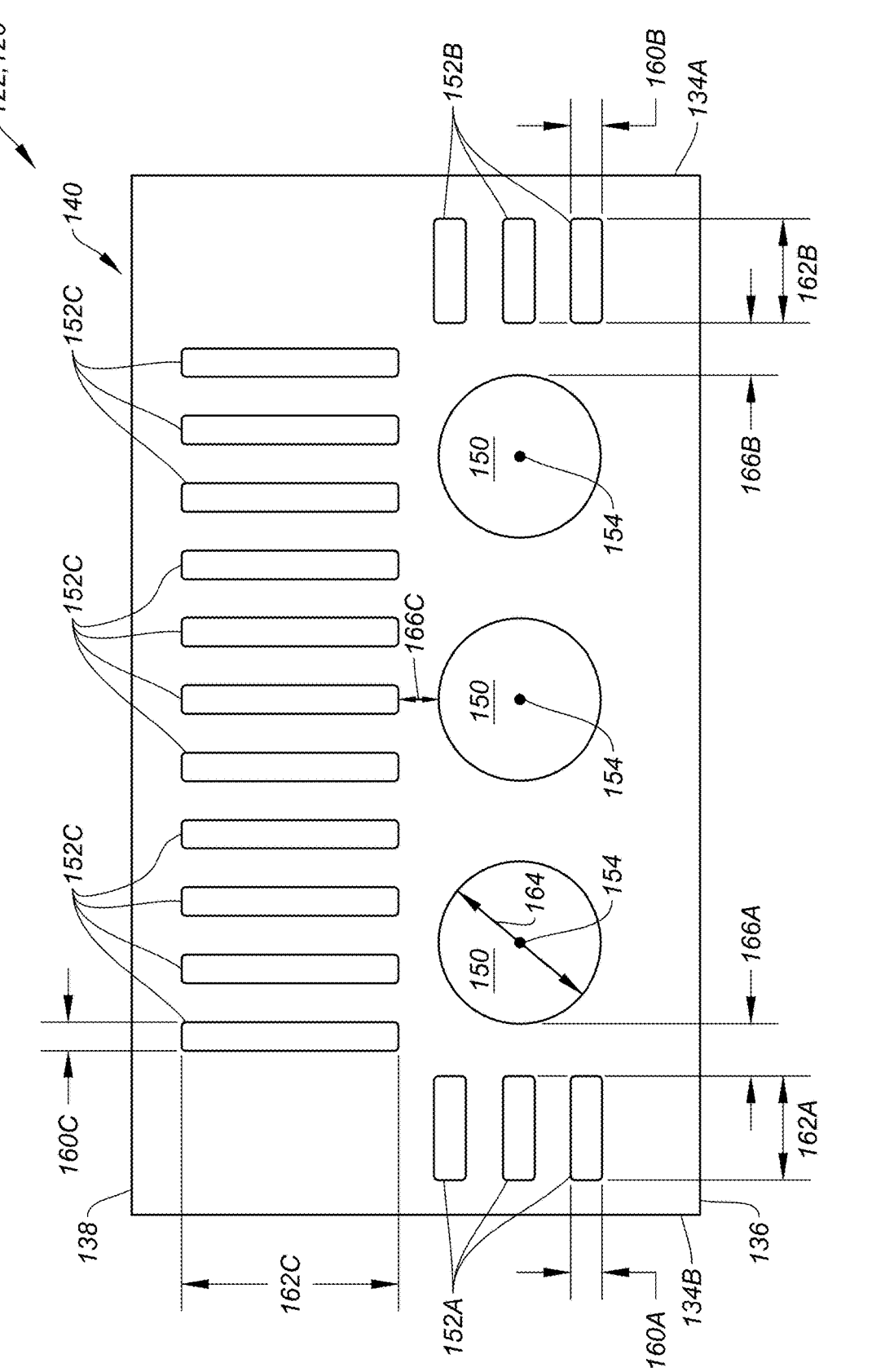
FIG. 5 is an illustration of a side of a housing sidewall for the electric device configured with multiple cable ports and multiple magnetic field obstruction apertures.

Referring to FIG. 5, each longitudinal sidewall 140 may be configured with one or more cable ports 150 and one or more magnetic field obstruction apertures 152A-C (generally referred to as "152"); e.g., eddy current obstruction apertures such as elongated slots. The cable ports 150 of FIG. 5 are arranged in a laterally extending array; e.g., a straight linear array. This array of the cable ports 150 may be located at a lateral intermediate position (e.g., centered) between the device lateral sides 134. Each of the cable ports 150 is configured as a passthrough port for a respective one of the electric cables 124; see FIGS. 3 and 4. Each cable port 150 of FIGS. 3 and 4, for example, extends longitudinally through the respective longitudinal sidewall 140 between the external environment 148 and the internal volume 130.

Referring to FIG. 5, the cable ports 150 may be configured with a common geometry; e.g., the same shape and dimensions. Each cable port 150 of FIG. 5, for example, has a common circular cross-sectional geometry when viewed in a reference plane perpendicular to a longitudinal centerline 154A, 154B (generally referred to as "154") of a respective cable 124A, 124B (see FIGS. 3 and 4) mated with that cable port 150. The present disclosure, however, is not limited to such an exemplary cable port arrangement. For example, if the electric cables 124 were to have different gauges, the respective cable ports 150 may have different diameters.

The obstruction apertures 152 of FIG. 5 are arranged into one or more groupings. The obstruction apertures 152A, 152B in each side grouping are arranged in a vertically extending array; e.g., a straight linear array. The lateral first side array of the obstruction apertures 152A are disposed to a first lateral side of and vertically overlaps the array of the cable ports 150. The lateral second side array of the obstruction apertures 152B are disposed to a second lateral side of and vertically overlaps the array of the cable ports 150. The array of the cable ports 150 are thereby arranged laterally between the lateral first side array of the obstruction apertures 152A and the lateral second side array of the obstruction apertures 152B.

The obstruction apertures 152C in the top grouping are arranged in a laterally extending array; e.g., a straight linear array. The vertical top array of the obstruction apertures 152C are disposed vertically above and laterally overlap the array of the cable ports 150. Each obstruction aperture 152 of FIGS. 3 and 4 extends longitudinally through the respective longitudinal sidewall 140 between the external environment 148 and the internal volume 130. Here, each obstruction aperture 152 is configured as an open aperture; e.g., a spatially unfilled, unoccupied through hole.

Referring to FIG. 5, the obstruction apertures 152 in each respective grouping may be configured with a common geometry; e.g., the same shape and dimensions. Each obstruction aperture 152A of FIG. 5, for example, has a common cross-sectional geometry when viewed in the reference plane. Each obstruction aperture 152B of FIG. 5 has a common cross-sectional geometry when viewed in the reference plane, which may (or may not) be the same as the cross-sectional geometries of the obstruction apertures 152A. Each obstruction aperture 152C of FIG. 5 has a common cross-sectional geometry when viewed in the reference plane, which may not (or may) be the same as the cross-sectional geometries of the obstruction apertures 152A and/or 152B. Here, each obstruction aperture 152 has non-circular shape such as an elongated shape; e.g., rectangular shape. The present disclosure, however, is not limited to such an exemplary obstruction aperture arrangement. For example, one or more or all of the groupings may be provided with obstruction apertures 152 having two or more different geometries; e.g., different shapes and/or dimensions. Moreover, while the obstruction apertures 152 are shown in FIG. 5 with select horizontal or vertical orientations, it is contemplated these orientations may be adjusted (e.g., rotated) by ninety degrees or less than ninety degrees.

Referring to FIGS. 3 and 4, the terminal block 128 is disposed within the device housing 126 and its internal volume 130. The terminal block 128, for example, may be mounted to an interior surface of the bottom wall 144. Referring to FIG. 3, the terminal block 128 includes one or more first electric terminals 156A for the first electric cables 124A. This terminal block 128 also include one or more second electric terminals 156B for the second electric cables 124B. Each of the first electric terminal 156A is electrically coupled to a respective one of the second electric terminals 156B.

Each first electric cable 124A projects longitudinally out of the external environment 148, through a respective one of the first wall cable ports 150, and into the internal volume 130. Within the internal volume 130, and a bare end portion of each first electric cable 124A is received by and electrically coupled to a respective one of the first electric terminals 156A. Here, a grommet 158A may (or may not) be provided at each first wall cable port 150 to provide a sealed interface and/or a buffer between the respective first electric cable 124A and the first longitudinal sidewall 140A of the device housing 126. Similarly, each second electric cable 124B projects longitudinally out of the external environment 148, through a respective one of the second wall cable ports 150, and into the internal volume 130. Within the internal volume 130, and a bare end portion of each second electric cable 124B is received by and electrically coupled to a respective one of the second electric terminals 156B. Here, a grommet 158B may (or may not) be provided at each second wall cable port 150 to provide a sealed interface and/or a buffer between the respective second electric cable 124B and the second longitudinal sidewall 140B of the device housing 126. With this arrangement, the terminal block 128 respectively electrically couples the first electric cables 124A to the second electric cables 124B within a protected internal environment of the internal volume 130.

During operation of the electric machine system 32 of FIG. 2, electricity may be conducted between the first electric cables 124A and the second electric cables 124B of FIG. 3. As the electricity is conducted longitudinally along each electric cable 124 through a respective cable port 150, referring to FIG. 5, an eddy current generated by the flow of the electricity may propagate (e.g., radiate) through the respective longitudinal sidewall 140 circumferentially around each cable port 150. Such eddy currents may subject the metal of the respective longitudinal sidewall 140 to relatively high temperatures if left unmitigated. However, by configuring the longitudinal sidewall 140 with its obstruction apertures 152, the propagation of the eddy currents may be obstructed. More particularly, each obstruction aperture 152 may obstruct an eddy current conduction path through the respective longitudinal sidewall 140. The provision of the obstruction apertures 152 may thereby facilitate a reduced operating temperature of the electric device 122 and its device housing 126.

Each cable port 150 of FIG. 5 has a port cross-sectional area when viewed in the reference plane. Each obstruction aperture 152 has an aperture cross-sectional area when viewed in the reference plane. The aperture cross-sectional area of one, some or all of the obstruction apertures 152 may be sized equal to or smaller than the port cross-sectional area of one, some or all of the cable ports 150.

Each obstruction aperture 152A-C of FIG. 5 has a minor axis dimension 160A-C (generally referred to as "160") and a major axis dimension 162A-C(generally referred to as "162") that is larger than the minor axis dimension 160A-C. The minor axis dimension 160A-C of one, some or all of the obstruction apertures 152A-C may be sized smaller than a diameter 164 of one, some or all of the cable ports 150. Similarly, the major axis dimension 162A, 162B of one, some or all of the obstruction apertures 152A, 152B may be sized smaller than the diameter 164 of one, some or all of the cable ports 150. Alternatively, the major axis dimension 162C of one, some or all of the obstruction apertures 152C may be sized equal to or larger than the diameter 164 of one, some or all of the cable ports 150.

Each obstruction aperture 152A, 152B of FIG. 5 is laterally spaced from the array of the cable ports 150 and at least one of its cable ports 150 by a respective lateral inter aperture-port distance 166A, 166B. Each obstruction aperture 152C of FIG. 5 is vertically spaced form the array of the cable ports 150 and at least one of its cable ports 150 by a vertical inter aperture-port distance 166C. Each of these inter aperture-port distances 166A-C(generally referred to as "166") may be sized equal to or smaller than the diameter 164 of one, some or all of the cable ports 150. In general, each inter aperture-port distance 166 is minimized to reduce an area for propagating eddy currents.

Figure 8:
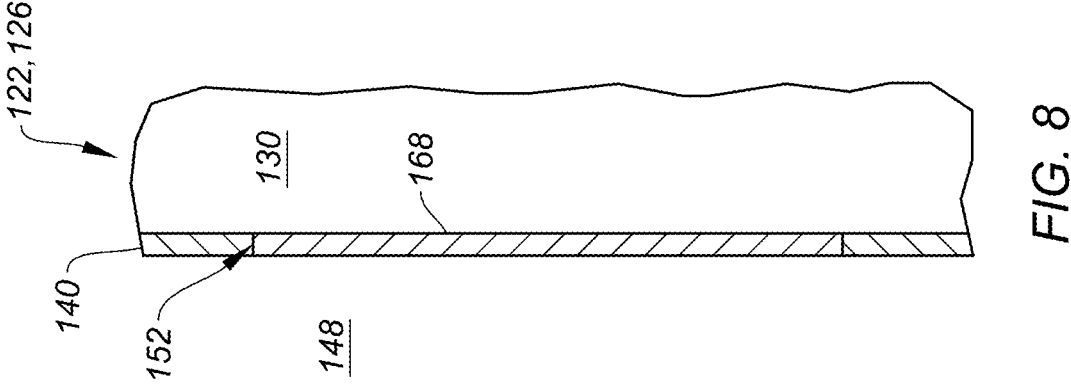
FIGS. 7 and 8 are partial sectional illustrations of the electric device at the housing sidewall with various covered magnetic field obstruction aperture arrangements.
Figure 6:
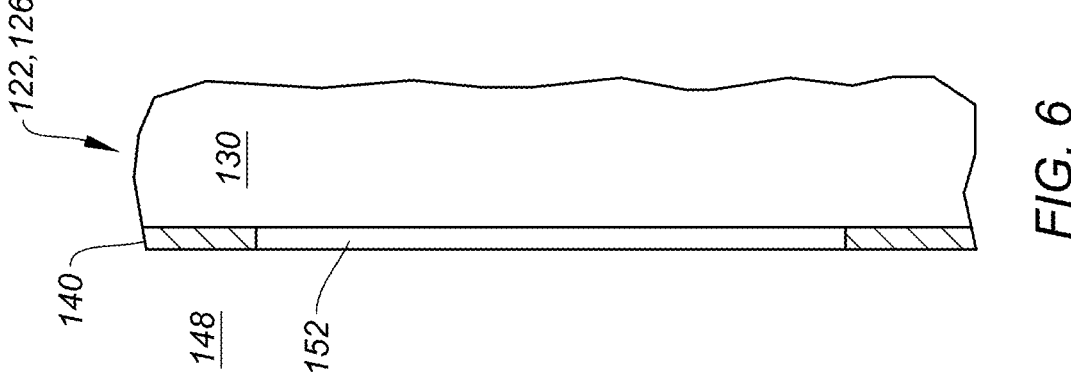
FIG. 6 is a partial sectional illustration of the electric device at the housing sidewall with an open magnetic field obstruction aperture.

In some embodiments, referring to FIG. 6, one, some or all of the obstruction apertures 152 may each provide a fluid coupling between the external environment 148 and the internal volume 130 within the electric device 122 and its device housing 126. With such an arrangement, in addition to obstructing the eddy currents as described above, the obstruction apertures 152 may also facilitate convective cooling and/or venting within the internal volume 130. In other embodiments, referring to FIGS. 7 and 8, fluid flow through one, some or all of the obstruction apertures 152 may each be blocked by a cover 168; e.g., a sheet of material, a plug of material, etc. Briefly, a single cover 168

13

Figure 7:
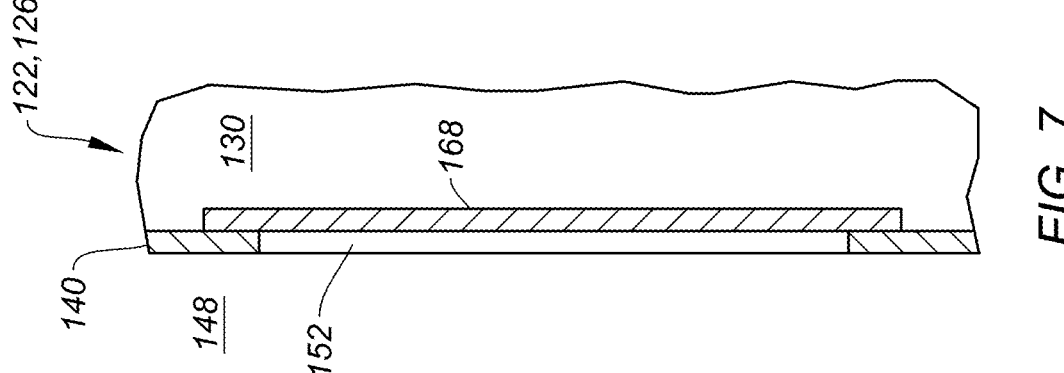

14 may be provided for multiple obstruction apertures 152, or each obstruction aperture 152 may be provided with its own discrete cover 168. The cover 168 of FIG. 7 is connected to the respective longitudinal wall 140 and may be contained within the internal volume 130. This cover 168 vertically and laterally overlaps the respective obstruction aperture 152 to close off that obstruction aperture 152. The cover 168 of FIG. 8 at least partially or completely plugs the respective obstruction aperture 152 to close off that obstruction aperture 152. With these arrangements of FIGS. 7 and 8, the internal volume 130 may be substantially (e.g., minus possible slight leakage around the electric cables 124 of FIG. 3) or completely fluidly isolated and decoupled from the external environment 148. However, to maintain the above described functionality of the respective obstruction aperture(s) 152, the cover(s) 168 may be constructed from or otherwise include a non-magnetic material; e.g., a material which does not propagate eddy currents. Examples of the cover material include, but are not limited to, a ceramic (e.g., silicon carbide material), a polymer matrix composite (PMC), a ceramic matrix composite (CMC) and an organic matrix composite (OMC).

While the electric device 122 of FIG. 3 is described above as providing an electrical coupling along the electric cables 112 of FIG. 2, the present disclosure is not limited to such an exemplary arrangement. The electric device 122, for example, may alternatively provide an electrical coupling along the electric cables 116 of FIG. 2, or along any other electric cables run in the aircraft propulsion system or, more generally, in the aircraft. Moreover, it is contemplated various other types of electric devices onboard the aircraft may be configured with the obstruction aperture(s) 152. For example, one or more of the obstruction apertures 152 may be configured in a sidewall of each machine housing 104 of FIG. 2, a sidewall of each controller housing 108 of FIG. 2, or otherwise. The present disclosure therefore is not limited to any particular types of electric devices configured with the obstruction aperture(s) 152.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
an electric device for the aircraft, the electric device including a device housing and a first electric terminal disposed within an internal volume of the device housing, the device housing including a first metal sidewall, a first wall cable port and an open first wall aperture next to the first wall cable port, the first metal sidewall between and bordering the internal volume and an external environment outside of the electric device, the first wall cable port projecting through the first metal sidewall from the external environment to the internal volume, and the open first wall aperture projecting through the first metal sidewall from the external environment to the internal volume; and
a first electric cable projecting longitudinally through the first wall cable port into the internal volume, the first electric cable received by and electrically coupled to the first electric terminal within the internal volume;
wherein the open first wall aperture is configured to obstruct an eddy current conduction path through the first metal sidewall.

2. The assembly of claim 1, wherein
the first wall cable port has a circular cross-sectional geometry; and
the open first wall aperture has a non-circular cross-sectional geometry.

3. The assembly of claim 1, wherein
the first wall cable port has a circular cross-sectional geometry; and
the open first wall aperture has an elongated cross-sectional geometry.

4. The assembly of claim 1, wherein
the first wall cable port has a first port cross-sectional area; and
the open first wall aperture has a first aperture cross-sectional area that is smaller than the first port cross-sectional area.

5. The assembly of claim 1, wherein
the open first wall aperture is spaced from the first wall cable port by an inter aperture-port distance; and
the inter aperture-port distance is equal to or smaller than a diameter of the first wall cable port.

6. The assembly of claim 1, wherein
the open first wall aperture has a major axis dimension and a minor axis dimension; and
the major axis dimension and the minor axis dimension are each smaller than a diameter of the first wall cable port.

7. The assembly of claim 1, wherein
the open first wall aperture has a major axis dimension and a minor axis dimension;
the major axis dimension is equal to or larger than a diameter of the first wall cable port; and
the minor axis dimension is smaller than the diameter of the first wall cable port.

8. The assembly of claim 1, wherein
the open first wall aperture is one of a plurality of open first wall apertures arranged in an array that is next to the first wall cable port; and
each of the plurality of open first wall apertures projects through the first metal sidewall from the external environment to the internal volume.

9. The assembly of claim 1, wherein
the open first wall aperture is one of a plurality of open first wall apertures arranged to a first side of the first cable port; and
each of the plurality of open first wall apertures projects through the first metal sidewall from the external environment to the internal volume.

10. The assembly of claim 1, wherein
the open first wall aperture is one of a plurality of open first wall apertures;
each of the plurality of open first wall apertures projects through the first metal sidewall from the external environment to the internal volume;
a first of the plurality of open first wall apertures is disposed to a first side of the first wall cable port; and
a second of the plurality of open first wall apertures is disposed to a second side of the first wall cable port.

11. The assembly of claim 1, wherein the device housing further includes a cover connected to the first metal sidewall and covering the open first wall aperture.

12. The assembly of claim 11, wherein the cover comprises a non-magnetic material.

13. The assembly of claim 1, wherein the internal volume is substantially fluidly decoupled from the external environment by the device housing.

14. The assembly of claim 1, further comprising:

a second electric cable projecting longitudinally into the internal volume through a second wall cable port in a second metal sidewall of the device housing, the second electric cable received by and electrically coupled to a second electric terminal within the internal volume; and a terminal block including and electrically coupling the first electric terminal and the second electric terminal.

15. The assembly of claim 1, wherein the electric device is configured as a junction box for the aircraft.

16. The assembly of claim 1, wherein the electric device is configured as an electric machine for the aircraft, and the electric machine is configurable as at least one of an electric motor or an electric generator.

17. The assembly of claim 1, wherein the electric device is configured as a controller.

18. An assembly for an aircraft, comprising:

an electric device for the aircraft, the electric device including a device housing and a first electric terminal disposed within an internal volume of the device housing, the device housing configured to substantially fluidly isolate the internal volume from an external environment outside of the electric device, the device housing including a first metal sidewall, a first wall cable port and a first wall aperture arranged proximate to the first wall cable port, the first metal sidewall between and bordering the internal volume and the external environment, the first wall cable port extending through the first metal sidewall between the external environment and the internal volume, and the first wall aperture extending through the first metal sidewall between the external environment and the internal volume; and a first electric cable extending longitudinally through the first wall cable port into the internal volume, the first electric cable received by and electrically coupled to the first electric terminal within the internal volume;

wherein the first wall aperture is configured to obstruct a magnetic field conduction path through the first metal sidewall.

19. An assembly for an aircraft, comprising:

an electric device for the aircraft, the electric device including a device housing and a plurality of first electric terminals disposed within an internal volume of the device housing, the device housing including a first metal sidewall, a plurality of first wall cable ports and a plurality of first wall apertures, the first metal sidewall between and bordering the internal volume and an external environment surrounding the electric device, each of the plurality of first wall cable ports extending through the first metal sidewall, the plurality of first wall apertures arranged in an array that is next to and overlaps each of the plurality of first wall cable ports, and each of the plurality of first wall apertures extending through the first metal sidewall; and a plurality of first electric cables, each of the plurality of first electric cables extending longitudinally from the external environment, through a respective one of the plurality of first wall apertures, into the internal volume, and each of the plurality of first electric cables received by and electrically coupled to a respective one of the plurality of first electric terminals within the internal volume;

wherein the plurality of first wall apertures are configured to obstruct magnetic field conduction paths in the first metal sidewall.

\* \* \* \* \*